(No Model.)
5 Sheets—Sheet 1.

J. P. TIRRELL.
CASH REGISTER AND INDICATOR.

No. 452,986. Patented May 26, 1891.

WITNESSES
INVENTOR

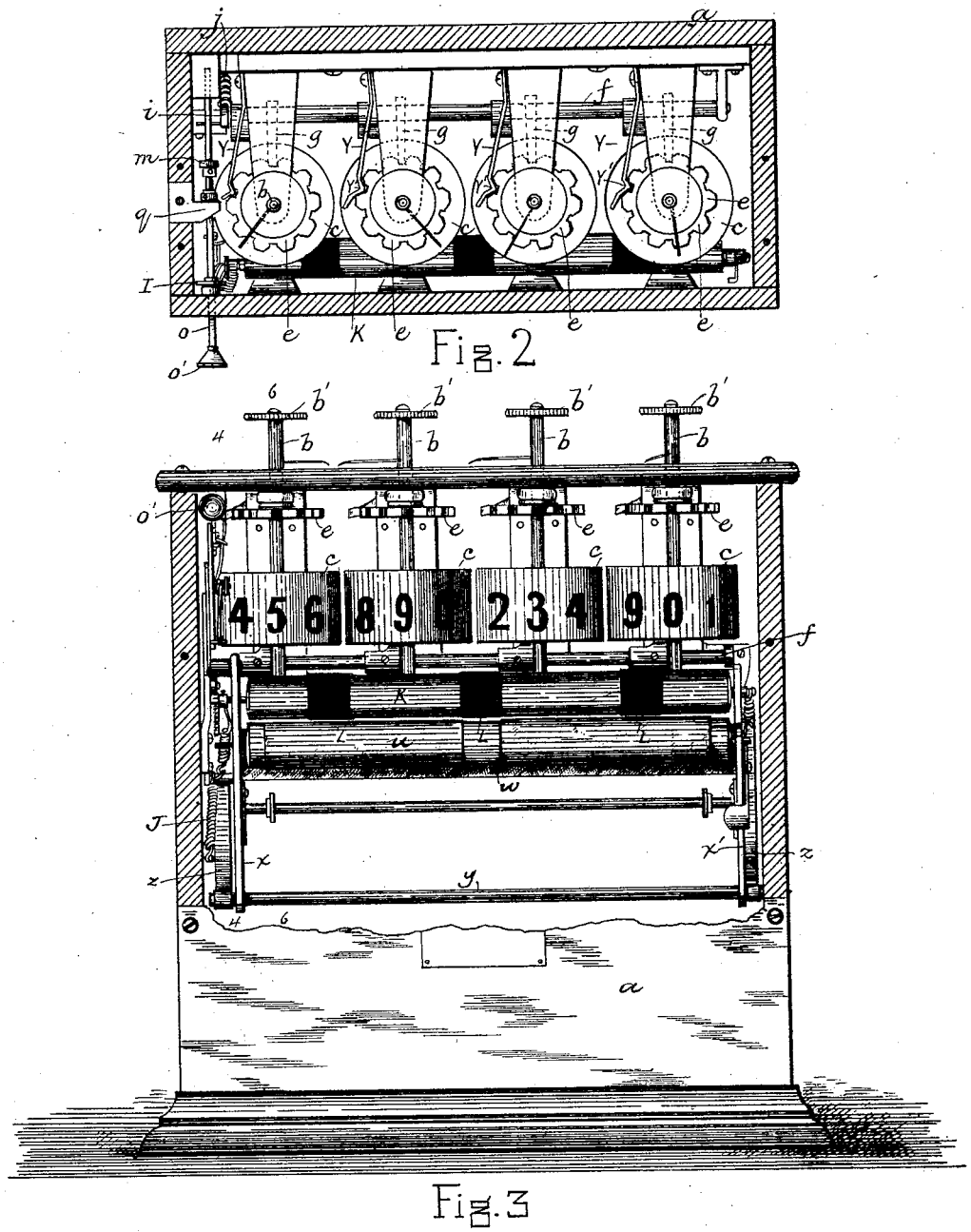

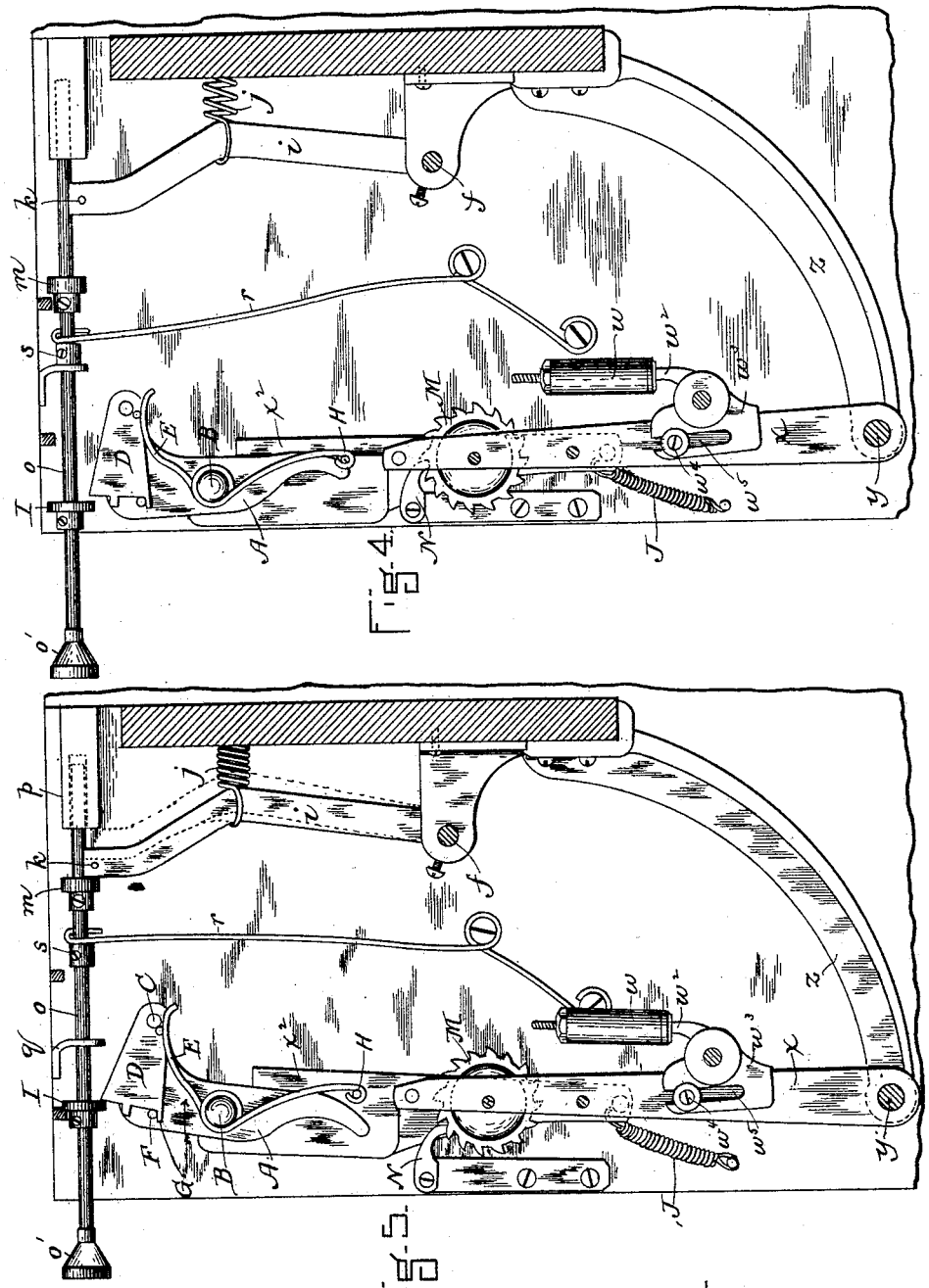

(No Model.) 5 Sheets—Sheet 4.

J. P. TIRRELL.
CASH REGISTER AND INDICATOR.

No. 452,986. Patented May 26, 1891.

WITNESSES
C. L. Bartlett
A. D. Harrison

INVENTOR
J. P. Tirrell
Wright Brown Quimby
Attys.

(No Model.)  5 Sheets—Sheet 5.

J. P. TIRRELL.
CASH REGISTER AND INDICATOR.

No. 452,986.  Patented May 26, 1891.

WITNESSES  INVENTOR

UNITED STATES PATENT OFFICE.

JACOB P. TIRRELL, OF BOSTON, ASSIGNOR OF ONE-HALF TO JAMES F. EMERSON, OF WAKEFIELD, MASSACHUSETTS.

CASH REGISTER AND INDICATOR.

SPECIFICATION forming part of Letters Patent No. 452,986, dated May 26, 1891.

Application filed May 31, 1890. Serial No. 353,743. (No model.)

*To all whom it may concern:*

Be it known that I, JACOB P. TIRRELL, of Boston, in the county of Suffolk and State of Massachusetts, have invented certain new and useful Improvements in Cash Registers and Indicators, of which the following is a specification.

This invention has for its object to provide a simple apparatus for indicating the amounts of money received by a cashier and for printing a record of the entire receipts in a day or other predetermined period.

The invention relates particularly to that class of cash-registers in which a visual indication of each amount paid is given by the person receiving the same, and which may be seen by the customer or person paying.

The invention consists in the improved devices and combinations of mechanism hereinafter described whereby a visual indication visible to the eye of the customer or payer and the printing of a record of each transaction are effected, as I will now proceed to describe.

Figure 1:
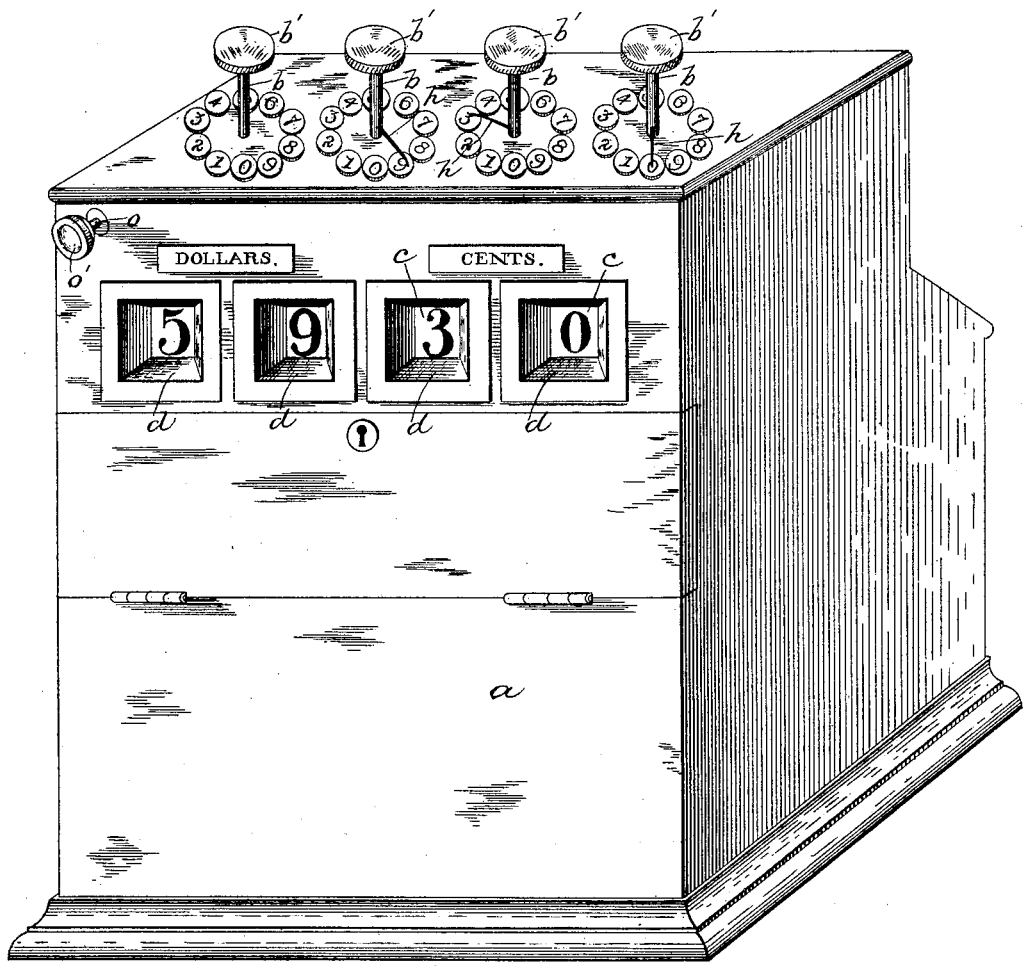
Figure 6:
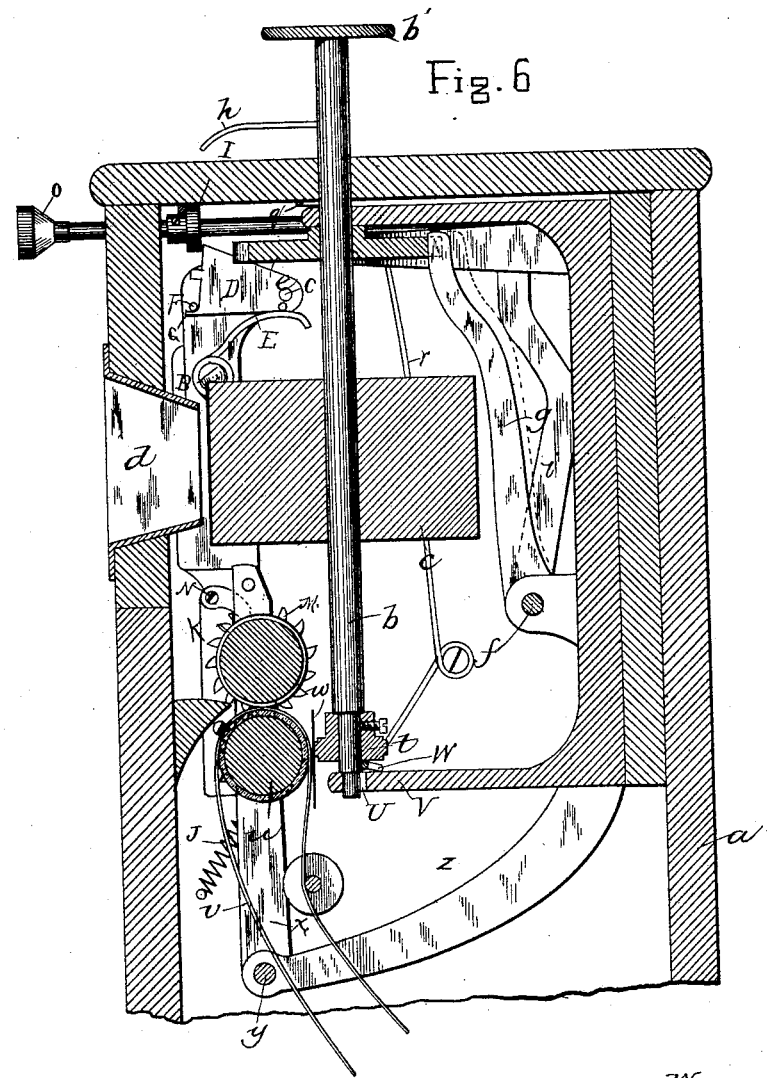
Figure 7:
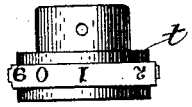
Figure 8:
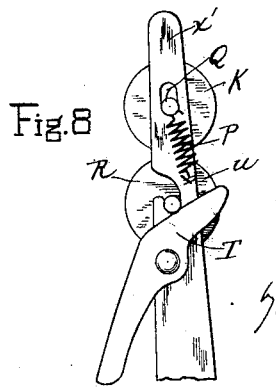
Figure 9:
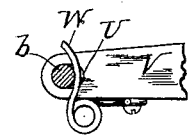
Figure 10:
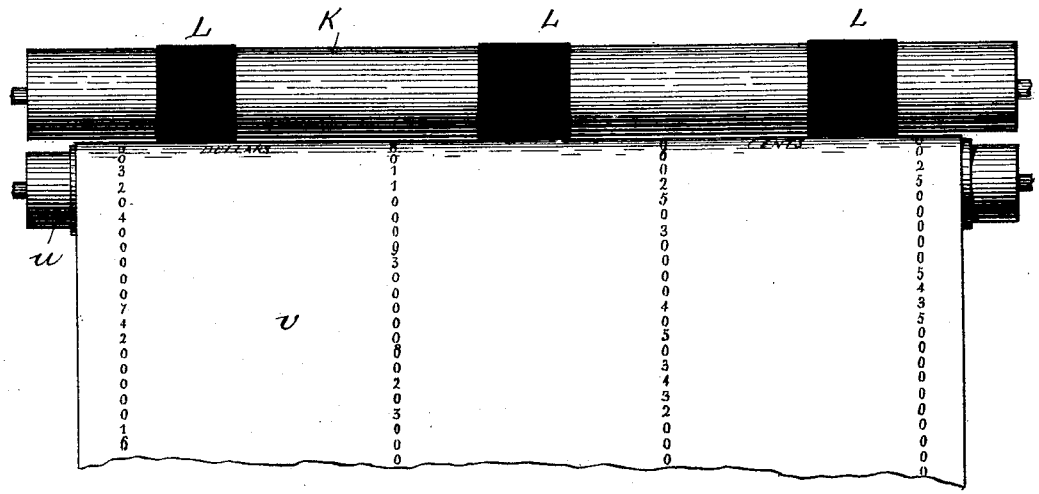
Figure 11:
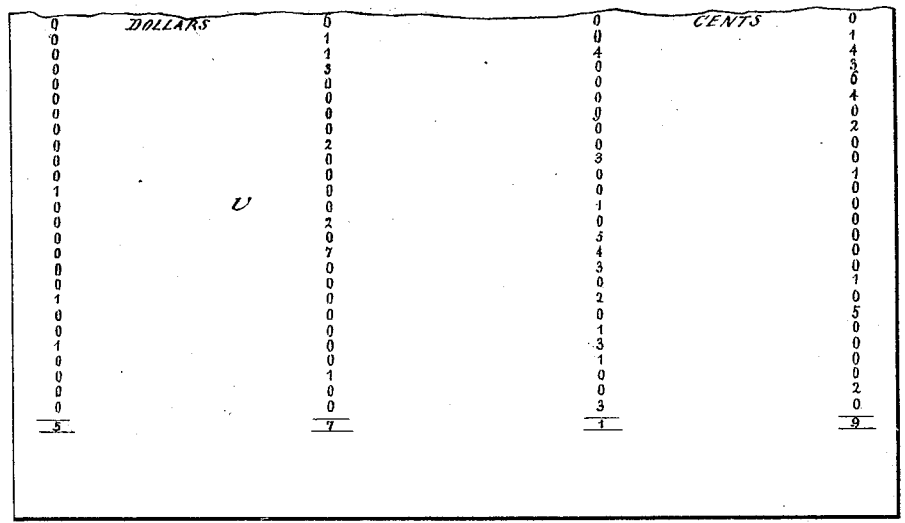

Of the accompanying drawings, forming a part of this specification, Figure 1 represents a perspective view of the exterior of a cash-register embodying my invention. Fig. 2 represents a top view of the same with the top of the casing removed. Fig. 3 represents a front view with the front of the casing removed. Figs. 4 and 5 represent sections on line 4 4 of Fig. 3, looking toward the left, said figures showing parts of the apparatus in different positions. Fig. 6 represents a section on line 6 6, Fig. 3. Figs. 7, 8, and 9 represent detail views. Fig. 10 represents a front elevation of a portion of the record-sheet and of the rolls that support and feed the same. Fig. 11 represents a side view of the lower end of the record-sheet.

The same letters of reference indicate the same parts in all the figures.

In the drawings, $a$ represents an inclosing box or casing of any suitable form and material. Journaled in bearings within said casing are a series of vertical spindles or shafts $b$, of which there may be any desired number. Each of these spindles is provided with a cylinder $c$, on the periphery of which are marked the numerals 1 2 3 4 5 6 7 8 9 0. The cylinders at the right-hand end, as viewed in Fig. 3, represent cents, while the others represent dollars. In the front of the casing are a series of apertures $d$, which enable portions of the peripheries of the cylinders to be seen from the front of the apparatus, one character of each cylinder being visible through the corresponding aperture. Said shafts $b$ are extended upwardly through the top of the casing and provided with hand-wheels or handles $b'$ at their upper ends, whereby each shaft and the cylinder thereon may be rotated to bring any figure of the cylinders $c$ opposite the aperture $d$. Each shaft $b$ is preferably provided above the casing with a pointer or indicator $h$, which, in conjunction with a series of numerals circularly arranged around the shafts, as shown in Fig. 1, indicates to the operator the figure on the corresponding cylinder, which is exposed at the corresponding aperture. Each shaft is provided with a notched locking-wheel $e$, containing a series of ten notches arranged at equal distances apart.

$f$ represents a shaft or bar journaled in bearings attached to the frame of the machine and provided with a series of arms $g$, corresponding in number to the cylinders $c$ and wheels $e$. Said arms project upwardly and are arranged to simultaneously engage the notches in the locking-wheels $e$ when the arms are in the position shown in full lines in Fig. 6, the said wheels and the cylinder $c$ being thus locked so that they cannot be rotated.

Secured to one end of the shaft $f$ is an arm $i$, which projects upwardly and is engaged with a spring $j$, which holds said arm $i$ and the locking-arms $g$ normally in the positions shown in full lines in Figs. 4, 5, and 6. The upper end of said arm $i$ has a lateral stud or pin $k$, which stands in position to receive pressure from a collar $m$ on a horizontal rod $o$, which is adapted to slide in guides $p$ $q$ within the casing and projects at one end through the front of the casing, where it is provided with a push-knob $o'$. The rod $o$ is normally pressed outwardly to the position shown in Figs. 2 and 4 by a spring $r$, attached to the interior of the casing and bearing at its free end against a collar $s$ on the rod $o$.

When the rod o is pushed inwardly against the pressure of its spring r, the collar m strikes the pin k on the arm i and swings said arm, together with the locking-arms g connected therewith, inwardly to the positions shown in dotted lines in Figs. 5 and 6, thus disengaging the arms g from the locking-wheels e, so that either or all of the cylinders c may be rotated.

Affixed to the lower portion of each shaft b is a type-wheel t, having raised printing characters in the form of numerals upon its periphery, said numerals corresponding to those on the cylinders c.

u represents a paper-supporting roller or cylinder having a yielding surface, arranged to support an endless band or strip of paper v and to press said strip against an ink-ribbon w, interposed between the roller u and the series of type-wheels t. The roller u is journaled in swinging arms x x', which are attached to the rock-shaft y, mounted to oscillate in bearings in fixed arms z within the casing a, said arms being adapted to oscillate, and thereby carry the paper-supporting roller u toward and from the type-wheels. The arm x has an extension $x^2$ projecting upwardly, and has an arm or lever A connected to its upper end by a pivot B.

To the arm or lever A is pivoted at C a dog or latch D, which is normally pressed upwardly by a spring E as far as a stop F on the arm or lever A will permit, said stop striking a projection G on the latch D. The spring E holds the lower end of the arm or lever A against the stud or stop H on the extension $x^2$ and permits the upper end of the lever A to swing backwardly in the direction indicated by the arrow in Fig. 5.

I represents a collar attached to the rod o and arranged to strike the upper portion of the latch D when said rod o is pushed inwardly, as shown in Fig. 5. Contact between the collar I and the latch D, when the rod o is being pushed inwardly, causes the latch D, lever A, arms x x', and paper-supporting roller u to move inwardly until the paper on the roller is pressed against the ink-ribbon and the type-wheels, thus effecting an impression upon the paper of the characters of the type-wheels that may be at the front of the type-wheels at the time. Further backward movement of the rod o, after the paper has been sufficiently pressed against the ink-ribbon and type-wheels, causes the spring-supported arm or lever A to yield in the direction indicated by the arrow in Fig. 5 until the latch D is sufficiently depressed to permit the collar I to pass over its upper portion, whereupon the latch is released and the arms x x' and the paper-supporting roller u are moved forward to the position shown in Fig. 4 by a spring J. When the rod o is released and pressed outwardly by its spring r, the collar I in passing over the latch D depresses the latter, and when the collar I has passed to the front of the latch D, as shown in Fig. 4, the latch is pressed upwardly by the spring E into position to again engage the collar I when the rod o is next pushed inwardly.

K represents a paper-feeding roller, which is journaled in the arms x x', and is provided with elastic bands L on its periphery, which are in frictional contact with the paper strip v. To the shaft of the roller K, at one end thereof, is affixed a ratchet-wheel M, with which engages a pawl N, pivoted to a fixed support within the casing a. When the paper-supporting roller u and its supporting-frame are pressed inwardly to effect the printing operation, as above described, the pawl or dog N slips over one or more of the teeth of the ratchet M without rotating said ratchet; but when the said roller u and its supporting-frame are forced outwardly by the spring J the pawl N engages one of the teeth of the ratchet M and gives the feeding-roll K a partial rotation, thus feeding the paper sufficiently to carry the characters last printed upon it away from the points where the type-wheels next act upon the paper. The feeding-roll K is pressed downwardly upon the paper-supporting roller u by means of springs P, the shaft of said roller K being permitted to rise and fall in the arms x x' by means of slots Q in said arms, as shown in Fig. 8. The shaft of the paper-supporting roller u is received in an open slot R in the arm x', so that the roll u may be readily removed from said arms x and x' by moving its shaft laterally out of the arm x' and then moving the roll endwise to withdraw its shaft from the arm x.

To facilitate the withdrawal of the shaft of the roller u from the slot R, I pivot a lever T to the arm x', as shown in Fig. 8, said lever bearing against said shaft and being formed to press the latter outwardly from the slot R.

I prefer to support each type-wheel t yieldingly, so that it may yield somewhat to the pressure of the paper against it, and to this end I form a slot U in the bearing V, which supports the lower end of each shaft b, and secure to said bearing a spring W, Figs. 6 and 9, arranged to bear upon the lower portion of the shaft b and press the type-wheel thereon outwardly toward the paper-supporting roller u.

In order that the operator may know when the cylinder is in exactly the right position when he is turning it from one position to another, a series of light springs Y, Fig. 2, are arranged to engage the notches of the locking-wheels e with sufficient pressure to notify the operator that the shaft is in position with one of its printing characters properly presented to the ink-ribbon. Said springs Y have projections Y', which spring into the notches of the wheels e, as shown in Fig. 2. Said springs are not, however, sufficiently stiff to lock the wheels e, but are intended simply to afford a slight resistance to their rotary movement.

It will be seen that the cylinders cannot be rotated to give the desired visual indication until they are unlocked by an inward movement of the rod o, and it will be further seen that the movement of said rod o necessary to unlock the cylinders, causes the impression upon the record-sheet of the characters presented by the type-wheels by the last adjustment of the cylinders.

In the operation of the machine the clerk or cashier, after receiving a payment, first pushes in the rod or slide o, and in so doing prints upon the record-sheet the characters that were left at the front portions of the type-wheels by the last adjustment of the machine, and at the same time unlocks the series of shafts, the described mechanism being so arranged that the record-sheet is pressed against the type-wheels and then released and forced back from the type-wheels before the rod o is pushed entirely in, so that the paper cannot bear against the type-wheels when they are being rotated. The operator then, while holding the push-rod o in its innermost position, adjusts the shafts b so as to indicate by the cylinders c the amount of the last payment, the type-wheels being correspondingly adjusted at the same time, so that they present characters to the record-sheet corresponding to those that are presented to the eye of the customer by the cylinders. The push-rod is then released and the shafts are locked in the position at which they were last adjusted. This completes one round of the operation, the next being a repetition of the above. It will be seen, therefore, that the shafts cannot be unlocked preparatory to giving a visual indication of a transaction without printing a record of the transaction indicated by the last adjustment of the shafts, so that each operator is obliged to print a record of the last preceding transaction or payment before setting the machine to indicate the succeeding payment.

The arms $x$ $x'$, supporting the rolls $u$ K, constitute a swinging frame carrying the sheet-supporting bed or roller and the feeding-roller. Said frame may be constructed in any other suitable way.

It is obvious that weights may be employed as substitutes for the spring $j$ that holds the locking-arms in engagement with the locking-wheels, and for the spring J, that retracts the swinging frame to draw back the sheet supporting and feeding rolls from the type-wheels.

Various other changes may be made in the details of construction without departing from the spirit of my invention. In case it is desired to register one hundred dollars or more at one operation the machine may be provided with one or more additional shafts. The ink-ribbon $w$ is supported by studs $w^2$, attached to slotted plates $w^3$, which are adjustably attached to the arms of the swinging frame by screws $w^4$, passing through slots $w^5$ in said plates.

The record-sheet should be of sufficient length to contain a record of the transactions of one day or more. At the end of each day the columns may be added up. The shafts $b$ may be arranged radially to bring the type-wheels at their lower ends nearer together, thus permitting the use of a narrower record-sheet.

The ink-ribbon may be omitted and the paper pressed directly against the type-wheels with sufficient force to cause the raised characters on the type-wheels to indent the paper; or printer's ink may be applied to the type-wheels by any other suitable inking devices.

I claim—

1. In a cash register and indicator, the combination, substantially as hereinbefore set forth, of a casing, a series of shafts journaled therein and adapted to be rotated from the exterior of the casing, type-wheels affixed to the shafts within the casing, locking devices within the casing, whereby the shafts are automatically locked, a record-sheet-supporting roll or bed within the casing, a movable frame carrying said roll and adapted to be moved to press the record-sheet against the series of type-wheels, and a slide or push-rod extending from the exterior of the casing into the latter and there engaged with the shaft-locking devices and with the roll-carrying frame, the arrangement being such that a movement of said slide forces the sheet-supporting roll against the type-wheels and at the same time unlocks the shafts and permits their rotation.

2. In a cash register and indicator, the combination, substantially as hereinbefore set forth, of a casing, a series of shafts journaled therein and projecting from the exterior thereof, type-wheels affixed to the shafts within the casing, visual indicators on the shafts, bearing characters like those on the type-wheels, devices within the casing for locking the shafts, a record-sheet-supporting roll or bed within the casing, and a slide or push-rod adapted to be operated from the exterior of the casing and connected with the locking devices and sheet-supporting roll within the casing, said slide being adapted to move the roll against the type-wheels and at the same time to unlock the shafts and permit their rotation.

3. In a cash-register and indicator, the combination, substantially as hereinbefore set forth, of a casing having a series of apertures, a series of shafts journaled in the casing and projecting from the exterior thereof, visual indicators or cylinders on said shafts coinciding with said apertures, and indicators visible from the top of the casing, the last-named indicators comprising marks or characters circularly arranged on the top of the casing around the shafts, and pointers affixed to the shafts and co-operating with said marks or characters.

4. In a cash-register, the combination of the casing, the series of shafts journaled therein, the locking-wheels on said shafts, the rock-shaft $f$, journaled in the casing, the locking-arms $g$, and the arm $i$ on said rock-shaft, a spring whereby the arms $g$ are normally held in engagement with the locking-wheels, and the push-rod or slide $o$, having a collar or projection arranged to engage the arm $i$, and thereby throw the locking-arms simultaneously out of engagement with the locking-wheels, as set forth.

5. In a cash-register, the combination of a casing, a series of shafts journaled therein and projecting through the exterior thereof, a series of type-wheels affixed to said shafts within the casing, a frame or carrier mounted in the casing to swing toward and from the type-wheels and provided with a pivoted latch, a sheet-supporting roll or bed carried by said frame, a push-rod $o$, movable in the casing and projecting through the front thereof, and provided with a collar adapted to engage the latch on said swinging frame and press the roll thereon against the type-wheels, and a spring whereby the swinging frame and roll are pressed back from the type-wheels when released by the push-rod, as set forth.

6. In a cash-register, the combination of a casing, a series of shafts journaled therein and projecting through the exterior thereof, a series of type-wheels affixed to said shafts within the casing, a frame or carrier mounted in the casing to swing toward and from the type-wheels, a sheet-supporting roll or bed carried by said frame, a spring-pressed lever A, pivoted to said frame, a spring-pressed latch D, pivoted to said lever, a push-rod $o$, having a collar or projection I arranged to engage said latch, whereby when said rod is pushed inwardly the swinging frame is moved to press the roll against the type-wheels, and is then released by the action of the lever A and latch D, and a spring which moves the said frame and roll away from the type-wheels on the release of the frame, as set forth.

7. In a cash-register, the combination, with the series of type-wheels and their supporting-shafts, of the sheet-supporting roll or bed, the swinging frame supporting said roll, a push-rod arranged to move said frame in the direction required to present the roll to the type-wheels, a spring arranged to move the frame in the opposite direction, a feed-roll mounted in said frame and provided with a ratchet M, and a pawl N, pivoted to a fixed support and arranged to engage the teeth of the ratchet and partly rotate the same during one of the movements of the frame, as set forth.

8. In a cash register and indicator, the combination of the sheet-supporting roll, the swinging arms $x$ $x'$, supporting said roll, said arm $x'$ having an open slot R receiving the shaft of said roll, and the lever T, pivoted to said arm and adapted to force said shaft out of the slot R, as set forth.

9. In a cash register and recorder, the combination of hand-wheels $b'$, shafts $b$, pointers $h$, locking-wheels $e$, indicating-cylinders $c$, type-wheels $t$, the swinging frame, the pressure-roller $u$, feed-roller K, ratchet-wheel M, all supported by said frame, and the push-rod $o$ for moving and releasing said frame, substantially as and for the purpose set forth.

In testimony whereof I have signed my name to this specification, in the presence of two subscribing witnesses, this 5th day of May, A. D. 1890.

JACOB P. TIRRELL.

Witnesses:
C. F. BROWN,
A. D. HARRISON.